(12) United States Patent
Gabb et al.

(10) Patent No.: US 12,606,216 B2
(45) Date of Patent: Apr. 21, 2026

(54) DEVICE FOR INFRASTRUCTURE-SUPPORTED ASSISTANCE OF A MOTOR VEHICLE

(71) Applicant: Robert Bosch GmbH, Stuttgart (DE)

(72) Inventors: Michael Gabb, Gaeufelden (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 391 days.

(21) Appl. No.: 18/254,583

(22) PCT Filed: Jan. 21, 2022

(86) PCT No.: PCT/EP2022/051359
§ 371 (c)(1),
(2) Date: May 25, 2023

(87) PCT Pub. No.: WO2022/167232
PCT Pub. Date: Aug. 11, 2022

(65) Prior Publication Data
US 2024/0010243 A1 Jan. 11, 2024

(30) Foreign Application Priority Data

Feb. 8, 2021 (DE) ..................... 10 2021 201 129.2

(51) Int. Cl.
*B60W 60/00* (2020.01)
(52) U.S. Cl.
CPC .... *B60W 60/0059* (2020.02); *B60W 60/0057* (2020.02)
(58) Field of Classification Search
None
See application file for complete search history.

(56) References Cited

U.S. PATENT DOCUMENTS

2016/0258777 A1* 9/2016 Bodake ............... G06F 3/04817
2019/0244521 A1 8/2019 Ran et al.

FOREIGN PATENT DOCUMENTS

CN 108492556 A * 9/2018 ........... G08G 1/0133
DE 102004035856 A1 3/2005
(Continued)

OTHER PUBLICATIONS

International Search Report for PCT/EP2022/051359, Issued May 19, 2022.

*Primary Examiner* — Justin S Lee
(74) *Attorney, Agent, or Firm* — NORTON ROSE FULBRIGHT US LLP

(57) ABSTRACT

A device for infrastructure-supported assistance of a motor vehicle. The device includes: a communication device that is configured to receive surroundings signals that represent the surroundings of the motor vehicle; a processor device that is configured to ascertain, based on the surroundings signals, infrastructure assistance data for infrastructure-supported assistance of the motor vehicle; the communication device being configured to send infrastructure assistance data signals that represent the ascertained infrastructure assistance data; the communication device and the processor device each being configured to continue operating in the event of an error, in such a way that the communication device continues to receive surroundings signals, the processor device continues to ascertain, based on the surroundings signals, infrastructure assistance data for assisting the motor vehicle, and the communication device continues to send the infrastructure assistance data signals. A method, a computer program, and a machine-readable memory medium are also described.

15 Claims, 2 Drawing Sheets

(56)            References Cited

FOREIGN PATENT DOCUMENTS

| | | |
|---|---|---|
| DE | 102006057741 A1 | 9/2007 |
| DE | 102014208666 A1 | 11/2015 |
| DE | 102014221759 A1 | 4/2016 |
| DE | 102015206496 A1 | 10/2016 |
| DE | 102016209993 A1 | 12/2017 |
| DE | 102016215478 A1 | 2/2018 |
| DE | 102017220420 B3 | 4/2019 |
| DE | 102019206847 A1 | 11/2020 |
| JP | 2020037400 A | 3/2020 |
| WO | 2017167673 A1 | 10/2017 |

* cited by examiner

Fig. 1
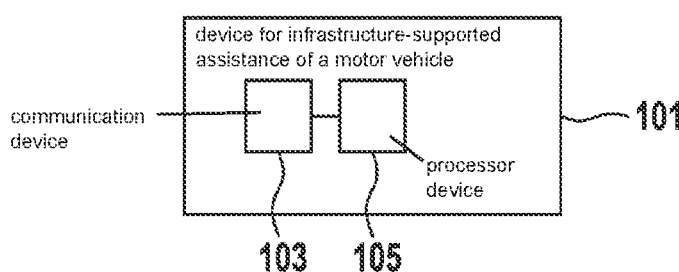
Fig. 2
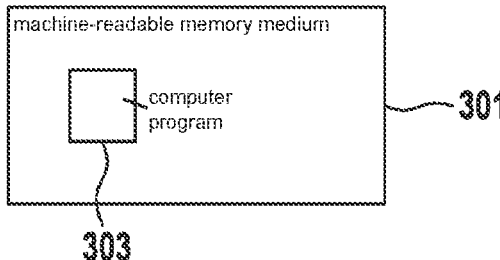
Fig. 3

DEVICE FOR INFRASTRUCTURE-SUPPORTED ASSISTANCE OF A MOTOR VEHICLE

FIELD

The present invention relates to a device for infrastructure-supported assistance of a motor vehicle, a method for infrastructure-supported assistance of a motor vehicle, a computer program, and a machine-readable memory medium.

BACKGROUND INFORMATION

Japan Patent Application No. JP 2020 037 400 A describes support of vehicles using a roadside unit (RSU).

German Patent No. DE 10 2017 220 420 B3 describes a method for generating a collection of traffic information.

German Patent Application No. DE 10 2019 206 847 A1 describes a method and a device for operating an automated vehicle.

SUMMARY

An object of the present invention is to provide for efficient infrastructure-supported assistance of a motor vehicle.

This object may be achieved via features of the present invention. Advantageous example embodiments of the present invention are disclosed herein.

According to a first aspect of the present invention, a device, in particular an RSU, for infrastructure-supported assistance of a motor vehicle is provided. According to an example embodiment of the present invention, the device includes:

a communication device that is configured to receive surroundings signals that represent the surroundings of the motor vehicle, a processor device that is configured to ascertain, based on the surroundings signals, infrastructure assistance data for infrastructure-supported assistance of the motor vehicle, the communication device being configured to send infrastructure assistance data signals that represent the ascertained infrastructure assistance data, the communication device and the processor device each being configured to continue operating in the event of an error, in such a way that the communication device continues to receive surroundings signals, the processor device continues to ascertain, based on the surroundings signals, infrastructure assistance data for assisting the motor vehicle, and the communication device continues to send the infrastructure assistance data signals.

According to a second aspect of the present invention, a method for infrastructure-supported assistance of a motor vehicle is provided, using the device according to the first aspect.

According to an example embodiment of the present invention, the method includes the following steps:

receiving, with the aid of the communication device, surroundings signals that represent the surroundings of the motor vehicle, ascertaining, with the aid of the processor device, infrastructure assistance data for infrastructure-supported assistance of the motor vehicle, based on the surroundings signals, sending, with the aid of the communication device, infrastructure assistance data signals that represent the ascertained infrastructure assistance data, the communication device and the processor device each being configured to continue operating in the event of an error, in such a way that the communication device continues to receive surroundings signals, the processor device continues to ascertain, based on the surroundings signals, infrastructure assistance data for infrastructure-supported assistance of the motor vehicle, and the communication device continues to send the infrastructure assistance data signals.

According to a third aspect of the present invention, a computer program is provided that includes commands which, when the computer program is executed by a computer, for example using the device according to the first aspect, prompt the computer to carry out a method according to the second aspect.

According to a fourth aspect of the present invention, a machine-readable memory medium is provided on which the computer program according to the third aspect is stored.

The present invention is based on and incorporates the knowledge that the above object may be achieved in that the device that assists the motor vehicle in an infrastructure-supported manner continues to operate even in the event of an error, and thus continues to support the motor vehicle in an infrastructure-supported manner, or assists the motor vehicle in an infrastructure-supported manner, even in the event of an error. The device is thus configured to continue operating in the event of an error.

This is implemented in that the communication device and the processor device are each configured to continue operating in the event of an error.

Thus, even in the event of an error, it is possible for the communication device to continue to receive surroundings signals, for the processor device to continue to ascertain, based on the surroundings signals, infrastructure assistance data for assisting the motor vehicle, and for the communication device to continue to send the infrastructure assistance data signals.

As a result, the assistance by the device according to the first aspect is secure assistance. Thus, this yields the technical advantage that the motor vehicle may be efficiently supported by the infrastructure, or that the motor vehicle may be efficiently assisted in an infrastructure-supported manner.

Infrastructure-supported assistance of the motor vehicle means in particular that infrastructure assistance data are provided to the motor vehicle. The motor vehicle may derive, for example, handling instructions based on the infrastructure assistance data. Based on the infrastructure assistance data, the motor vehicle itself may, for example, decide what to do.

The wording "in one specific embodiment of the device according to the first aspect" or similar used in this description encompasses the wording "in one specific embodiment of the device according to the first aspect, the specific embodiment including the particular features of at least one of the specific embodiments described in the description." This means that the particular features of the specific embodiments described in the description may also be in any arbitrary combination.

The acronym "RSU" stands for "roadside unit." The following terms may also be used synonymously with the term "RSU": roadside infrastructure unit, communication module, roadside communication module, roadside radio unit, roadside transmitting station.

In one specific embodiment of the present invention, it is provided that the device includes an energy unit that is configured to supply elements of the device, in particular the communication device and/or the processor device, with electrical energy. The energy unit includes an electrical energy store, for example. The energy unit is configured, for example, to continue operating in the event of an error.

In one specific embodiment of the present invention, it is provided that the communication device and/or the processor device have/has a redundant and/or diversified design.

This may yield the technical advantage, for example, that the communication device and the processor device may continue to operate efficiently in the event of an error.

For example, according to an example embodiment of the present invention, the processor device includes at least two processors, each of which, independently of the other, ascertains or may ascertain the infrastructure assistance data, based on the surroundings signals. For example, the communication device includes at least two communication interfaces, each of which, independently of the other, receives or may receive the surroundings signals and/or sends or may send the infrastructure assistance data signals.

According to one specific embodiment of the present invention, it is provided that the communication device and the processor device are each configured, in the event of an error, to end the continued operation after a predetermined time period elapses.

This may yield the technical advantage, for example, that the assistance by the infrastructure is available for the predetermined time period, this yielding in particular the further technical advantage that the device may go into a secure state, for example a standby state, in a controlled manner.

For example, it is thus provided that the communication device and the processor device are each configured to go into a secure state, for example a standby state, after the predetermined time period elapses.

In one specific embodiment of the present invention, it is provided that the communication device and the processor device are each configured, in the event of an error, to continue operating until the motor vehicle can handle a traffic situation without infrastructure assistance data.

This may yield the technical advantage, for example, that it may be efficiently ensured that the motor vehicle continues to obtain support from the infrastructure until the motor vehicle can handle the specific existing traffic situation itself without support by the infrastructure.

For example, according to an example embodiment of the present invention, the processor device is configured to ascertain, based on the surroundings signals, when the motor vehicle can handle the specific existing traffic situation itself without support by the infrastructure. A condition in this regard is, for example, the number of further motor vehicles in the surroundings of the motor vehicle. The ascertainment of when the motor vehicle can handle the specific existing traffic situation itself without support by the infrastructure, is carried out based on this number, for example. For example, if this number is less than or equal to a predetermined number threshold value, it is established with the aid of the processor device, for example, that the motor vehicle can handle the specific existing traffic situation itself without support by the infrastructure. It is pointed out that the preceding and/or subsequent conditions may be, for example, a necessary or sufficient condition in each case.

In addition to or instead of the number of motor vehicles, in one specific embodiment of the present invention it may be provided that a particular distance of the motor vehicles from one another and/or a particular speed of the motor vehicles and/or an existing topography, which may include a tunnel entrance, for example, are/is used as a particular parameter or a particular condition in order to ascertain whether the motor vehicle can handle the specific existing traffic situation itself without support by the infrastructure. This means that the processor device is configured, for example, to ascertain, based on one or multiple of the parameters stated above, when or whether the motor vehicle can handle the specific existing traffic situation itself without support by the infrastructure.

For example, if the particular distance is greater than or equal to a predetermined distance threshold value, it is established with the aid of the processor device, for example, that the motor vehicle can handle the specific existing traffic situation itself without support by the infrastructure.

For example, if the particular speed is less than or equal to a predetermined speed threshold value, it is established with the aid of the processor device, for example, that the motor vehicle can handle the specific existing traffic situation itself without support by the infrastructure.

For example, the predetermined distance threshold value is a function of the particular speed of the motor vehicles.

For example, it is established with the aid of the processor device, for example, that the motor vehicle cannot yet handle the specific existing traffic situation itself without support by the infrastructure if the topography includes a critical traffic installation, for example a tunnel entrance.

A critical traffic installation is one of the following traffic installations, for example: tunnel entrance, tunnel exit, tunnel, junction, traffic circle, expressway on-ramp, expressway off-ramp, intersection, T-junction.

For example, the communication device is configured to receive a communication message, sent by the motor vehicle, which indicates that the motor vehicle can handle the specific existing traffic situation itself without support by the infrastructure. For example, the processor device is configured to ascertain, based on the communication message, that the motor vehicle can handle the specific existing traffic situation itself without support by the infrastructure. For example, it is established with the aid of the processor device that the motor vehicle can handle the specific existing traffic situation itself without support by the infrastructure, when an appropriate communication message has been received.

For example, an appropriate communication message must have been received, and also the above-mentioned number must be less than or equal to the predetermined number threshold value, in order for the processor device to determine that the motor vehicle can handle the specific existing traffic situation itself without support by the infrastructure.

In one specific embodiment of the present invention, it is provided that the communication device and the processor device are each configured, in the event of an error, to continue operating for a predetermined time period, and to end the continued operation after the predetermined time period elapses. For example, the following applies:

$$8 \text{ s} \leq \text{predetermined time period} \leq 10 \text{ s}.$$

According to one specific embodiment of the present invention, it is provided that the infrastructure assistance data include a control command for controlling an infrastructure component that is situated in the surroundings of the motor vehicle, the communication device being config-
ured to send the control command to the infrastructure
component.

This may yield the technical advantage, for example, that
the infrastructure component may be efficiently controlled.
Such an infrastructure component, depending on the type of
infrastructure component, may support the motor vehicle in
different ways, so that an efficient support of the motor
vehicle by the infrastructure may accordingly be achieved.
For example, the infrastructure component is a lighting
device that illuminates a present traffic situation, so that, for
example, surroundings sensors of the motor vehicle may
efficiently detect the present traffic situation. For example,
the infrastructure component is an electronic display that
may display information corresponding to the control com-
mand, so that, for example, a driver of the motor vehicle may
efficiently guide the motor vehicle based on the information.

When the singular is used for the infrastructure compo-
nent, the plural is always to be construed, and vice versa.
The same applies for the control command.

According to one specific embodiment of the present
invention, it is provided that the infrastructure component is
a lighting device, the control command being ascertained in
such a way that, for a control of the infrastructure compo-
nent based on the control command, the lighting device
illuminates the motor vehicle and/or an infrastructure sur-
roundings sensor that is situated in the surroundings of the
motor vehicle.

This may yield the technical advantage, for example, that
the motor vehicle and/or the infrastructure surroundings
sensor may be efficiently illuminated. Thus, for example, an
infrastructure surroundings sensor that is situated in the
surroundings of the motor vehicle may efficiently detect the
motor vehicle itself and/or the surroundings of the motor
vehicle, so that, for example, the traffic situation may be
detected with more details than without the corresponding
illumination by the lighting device.

According to one specific embodiment of the present
invention, it is provided that the infrastructure assistance
data include remote control commands for remotely con-
trolling transverse and/or longitudinal guiding of the motor
vehicle, the communication device being configured to send
the remote control commands to the motor vehicle.

This may yield the technical advantage, for example, that
the motor vehicle may be efficiently remotely controlled.
According to this specific example embodiment, it is thus
provided that via the remote control, external, i.e., remote,
intervention may be made directly into an operation of the
motor vehicle or into a guidance of the motor vehicle. Thus,
for example, a possible collision of the motor vehicle with
a potential collision object in the surroundings of the motor
vehicle may be efficiently avoided, or the severity of an
accident may be reduced. In addition, it is thus advanta-
geously made possible for the motor vehicle to be efficiently
remotely controlled as the result of a critical situation in
which the motor vehicle itself is not able to manage this
situation. Such critical situations may include, for example,
traveling through the following infrastructure sections: tun-
nel, expressway on-ramp, expressway off-ramp, expressway
junction, bridge, intersection, in particular an intersection in
an urban area, traffic circle, parking facility.

In general, the support by the infrastructure is carried out
in the above situations, for example. This means in particular
that in such a situation the method is carried out according
to the second aspect, for example.

In one specific embodiment of the present invention, it is
provided that the processor device is configured to make a prediction, based on the surroundings signals, of a traffic
situation that includes the motor vehicle in order to ascertain
a future traffic situation, the processor device being config-
ured to ascertain the infrastructure assistance data based on
the future traffic situation.

This may yield the technical advantage, for example, that
the infrastructure assistance data may be efficiently ascer-
tained. According to this specific embodiment of the present
invention, it is thus provided that the future traffic situation
is additionally taken into account for ascertaining the infra-
structure assistance data. This is predicted, i.e., forecast,
based on the surroundings signals.

According to one specific embodiment of the present
invention, it is provided that the infrastructure assistance
data include traffic situation data that represent the ascer-
tained future traffic situation.

This may yield the technical advantage, for example, that
the ascertained future traffic situation may be efficiently
provided to the motor vehicle. According to this specific
embodiment, it is thus provided that the result of the
prediction, i.e., the future traffic situation, is provided to the
motor vehicle, so that the motor vehicle may efficiently plan
and implement operations itself, based on the future traffic
situation.

According to one specific embodiment of the present
invention, it is provided that the infrastructure assistance
data include first trajectory data that represent a comfort
trajectory to be traveled by the motor vehicle in the normal
case, and second trajectory data that represent an emergency
trajectory to be traveled by the motor vehicle in an emer-
gency case.

This may yield the technical advantage, for example, that
the motor vehicle may be efficiently assisted. The emer-
gency case exists, for example, when an error is identified in
the motor vehicle and/or an emergency case is identified by
the device. In the latter case, for example the motor vehicle
is informed of the emergency case, using the communication
device, so that the motor vehicle may switch from traveling
the comfort trajectory to traveling the emergency case
trajectory. In the former case, the motor vehicle itself may
switch from traveling the comfort trajectory to traveling the
emergency case trajectory.

A comfort trajectory is characterized in that, for example,
there is no rapid/sudden braking and/or jerking.

An emergency trajectory is characterized in that, for
example, jerking and/or rapid/sudden braking and/or emer-
gency braking are/is allowed.

According to one specific embodiment of the present
invention, it is provided that the processor device is config-
ured to ascertain a configuration parameter and/or an update
program for an infrastructure component, for example to
read out same from a memory, the communication device
being configured to send the configuration parameter and/or
the update program to the infrastructure component.

This yields the technical advantage, for example, that the
infrastructure component may be efficiently maintained
remotely, so that, for example, it may be efficiently ensured
that the infrastructure component functions correctly, or that
software and/or firmware is/are up to date.

According to one specific embodiment of the present
invention, it is provided that the processor device is config-
ured to monitor an infrastructure component, in particular to
monitor an operating state of the infrastructure component.
When the infrastructure component is a surroundings sensor,
for example, the monitoring includes, for example, moni-
toring of an analysis result of a surroundings analysis, which
is carried out based on surroundings sensor signals of the surroundings sensor, for plausibility and/or for correctness. For example, the monitoring of the analysis result includes comparing the analysis result to multiple further analysis results of multiple further surroundings analyses that are carried out based on surroundings sensor signals of multiple further surroundings sensors, the multiple further analysis results matching at least partially, for example completely, and in the event of a deviation that is greater than or equal to a predetermined deviation threshold value, an implausible and/or incorrect analysis result being assumed, so that it is determined that the surroundings sensor has an error. Thus, according to this specific embodiment it is assumed that when the majority of the surroundings sensors deliver an analysis result that at least partially matches, these surroundings sensors are also then functioning correctly. If the monitored surroundings sensor now delivers a differing analysis result, this is an indication of incorrect behavior. If the surroundings sensor provides no surroundings sensor signals at all, i.e., if no surroundings sensor signals are received by the surroundings sensor, it is determined, for example, that the surroundings sensor has an error.

The monitoring of the infrastructure component includes, for example, initiating a self-diagnostic test of the infrastructure component.

The monitoring is carried out regularly, for example, in particular without being prompted. The monitoring is carried out, for example, as warranted, for example when anomalies in the behavior of the infrastructure component have occurred.

In one specific embodiment of the present invention, it is provided that the processor device is configured to ascertain, in the event of an error, a communication message that indicates how long infrastructure assistance via the infrastructure assistance data is still available, and/or which motor vehicle(s) is/are still obtaining infrastructure assistance via the infrastructure assistance data, the communication device being configured to send the communication message to the motor vehicle(s).

This yields the technical advantage, for example, that the motor vehicle may be efficiently informed remotely of how long the infrastructure assistance is still available, or whether the motor vehicle is still obtaining infrastructure assistance despite an error. Similarly, the motor vehicle or motor vehicles itself/themselves is/are thus advantageously enabled to take appropriate measures in order to prepare for an end to the infrastructure assistance.

In one specific embodiment of the method of the present invention, according to the second aspect it is provided that the method is a computer-implemented method.

Technical functionalities of the method according to the second aspect result from corresponding technical functionalities of the device according to the first aspect, and vice versa.

This means that method features result from device features, and vice versa.

In one specific embodiment of the present invention, it is provided that the motor vehicle is a motor vehicle that is at least semi-automatedly guided.

The term "at least semi-automated guidance" encompasses one or multiple of the following cases: assisted guidance, semi-automated guidance, highly automated guidance, fully automated guidance.

Assisted guidance means that a driver of the motor vehicle continually carries out either the transverse guiding or the longitudinal guiding of the motor vehicle. The respective other driving task (i.e., a control of the longitudinal guiding or the transverse guiding of the motor vehicle) is carried out automatically. This means that during assisted guidance of the motor vehicle, either the transverse guiding or the longitudinal guiding is automatically controlled.

Semi-automated guidance means that in a specific situation (for example: driving on an expressway, driving within a parking facility, passing an object, driving within a lane that is specified by lane markings) and/or for a certain time period, longitudinal guiding and transverse guiding of the motor vehicle are automatically controlled. A driver of the motor vehicle him/herself does not have to manually control the longitudinal and transverse guiding of the motor vehicle. However, the driver must continually monitor the automatic control of the longitudinal and transverse guiding in order to be able to manually intervene if necessary. The driver must be prepared at any time to take full control of the motor vehicle guidance.

Highly-automated guidance means that for a certain time period in a specific situation (for example: driving on an expressway, driving within a parking facility, passing an object, driving within a lane that is specified by lane markings), longitudinal guiding and transverse guiding of the motor vehicle are automatically controlled. A driver of the motor vehicle him/herself does not have to manually control the longitudinal and transverse guiding of the motor vehicle. The driver does not have to continually monitor the automatic control of the longitudinal and transverse guiding in order to be able to manually intervene if necessary. If necessary, a takeover request is automatically output to the driver, in particular with a sufficient time reserve, to take over the control of the longitudinal and transverse guiding. The driver must thus potentially be capable of taking over the control of the longitudinal and transverse guiding. Limits of the automatic control of the transverse and longitudinal guiding are automatically recognized. With highly automated guidance, it is not possible in every starting situation to automatically bring about a minimal-risk state.

Fully automated guidance means that in a specific situation (for example: driving on an expressway, driving within a parking facility, passing an object, driving within a lane that is specified by lane markings), longitudinal and transverse guiding of the motor vehicle are automatically controlled. A driver of the motor vehicle him/herself does not have to manually control the longitudinal and transverse guiding of the motor vehicle. The driver does not have to monitor the automatic control of the longitudinal and transverse guiding in order to be able to manually intervene if necessary. Before the automatic control of the transverse and longitudinal guiding ends, a request to the driver to take over the driving task (control of the transverse and longitudinal guiding of the motor vehicle), in particular with a sufficient time reserve, takes place automatically. If the driver does not take over the driving task, a return is automatically made into a minimal-risk state. Limits of the automatic control of the transverse and longitudinal guiding are automatically recognized. In all situations, it is possible to automatically return into a minimal-risk system state.

In one specific embodiment of the method of the present invention, it is provided that the motor vehicle is manually guided by a driver.

When the singular is used for the motor vehicle, the plural is always to be construed, and vice versa. This means that the concept described in the description may also be applied to multiple motor vehicles. This means that the assistance by the infrastructure may also be applied to multiple motor vehicles. This means that multiple motor vehicles may also be supported by the infrastructure, or that multiple motor vehicles may also be assisted by the infrastructure.

The terms "assist" and "support" may be used synonymously.

In one specific embodiment of the present invention, it is provided that the surroundings signals include surroundings sensor signals of one or multiple surroundings sensors.

Within the meaning of the description, a surroundings sensor is one of the following surroundings sensors, for example: radar sensor, LIDAR sensor, ultrasonic sensor, video sensor, magnetic field sensor, and infrared sensor. The surroundings sensor is, for example, a surroundings sensor of the motor vehicle, i.e., a motor vehicle's own surroundings sensor. The surroundings sensor is, for example, the surroundings sensor of the infrastructure, i.e., an infrastructure surroundings sensor. For multiple surroundings sensors, for example at least one surroundings sensor is a motor vehicle's own surroundings sensor and/or for example, at least one surroundings sensor is an infrastructure surroundings sensor.

Infrastructure surroundings sensors are situated with a spatial distribution, for example.

Infrastructure surroundings sensors have a diversified and/or redundant design, for example.

Motor vehicle surroundings sensors, i.e., a motor vehicle's own surroundings sensors, have a diversified and/or redundant design, for example.

A surroundings sensor is, for example, a secure surroundings sensor, i.e., is classified according to ASIL. The acronym "ASIL" stands for "Automotive Safety Integrity Level." This means that a surroundings sensor is classified according to an ASIL level.

Statements made in conjunction with a surroundings sensor analogously apply for multiple surroundings sensors, and vice versa.

In one specific embodiment of the present invention, it is provided that the communication device is configured to receive data signals that represent data that influence traffic. The processor device is configured, for example, to ascertain the infrastructure assistance data, based on the data signals. Such data include, for example, weather data and/or data from a database, for example a cloud database. Data include historical traffic data, for example.

In one specific embodiment of the present invention, it is provided that the device analyzes the surroundings of the motor vehicle based on sensor signals of sensors, in particular surroundings sensors, that are situated in the surroundings of the motor vehicle, i.e., within an infrastructure, in order to ascertain a present traffic situation.

The sensors are infrastructure (surroundings) sensors, for example. For example, the sensors are motor vehicle surroundings sensors. For example, data that influence traffic in the surroundings are additionally optionally used for analyzing the surroundings. Such data include, for example, weather data, preferably weather data of a weather sensor and/or weather data from some other source, for example from a database, in particular a cloud database.

The data, for example the surroundings data that describe the surroundings, include, for example, raw data and/or preprocessed data (for example, raw data concerning object data). A source or sources for the data is/are in particular infrastructure (surroundings) sensors and/or motor vehicle surroundings sensors and/or a database, in particular a cloud database.

In one specific embodiment of the present invention, the sensors (in general, sources) have a redundant and/or diversified design. For example, a radar sensor and a LIDAR sensor as well as a video sensor are provided as sensors for detecting the surroundings of the motor vehicle.

In one specific embodiment of the present invention, the sensors (in general, sources) are classified or certified according to an ASIL level.

For analyzing the traffic situation and/or the influences on the traffic situation, in one specific embodiment further data are additionally used in the analysis, for example weather data and surroundings data (which represent, for example, a setting that is illuminated by lamps).

In one specific embodiment of the present invention, a control of infrastructure components in the infrastructure is provided for optimizing the analysis with the aid of the device. For example, a lighting device is controlled in such a way that it illuminates a setting in the infrastructure or lights it in a targeted manner.

The ascertained data and/or results, i.e., the surroundings situation (the present traffic situation), are/is sent to selected motor vehicles, or according to one specific embodiment, to all motor vehicles, with the aid of the device. The motor vehicles use these data for their driving function, for example.

The communication between the device and the motor vehicle is secure, for example.

In the context of the description, "safe" means, in particular, "safe" and "secure." These two English terms are usually translated into German as "sicker." Nevertheless, these words have a partially different meaning in English.

The term "safe" is directed in particular to the subject of accidents and accident avoidance. A remote control that is "safe" has the result in particular that a probability of an accident or a collision is less than or equal to a predetermined probability threshold value.

The term "secure" is directed in particular to the subject of computer protection or hacker protection, i.e., in particular how securely a (computer) infrastructure and/or a communication infrastructure, in particular a communication link between a motor vehicle and a remote control device for remotely controlling a motor vehicle, are/is protected from unauthorized access or data manipulation by third parties (hackers).

In one specific embodiment of the present invention, both the motor vehicle and the device check whether the data are correct, are at the right time (i.e., are still usable), are from the right sender, etc.

In one specific embodiment of the present invention, the communication device is configured to send and/or to receive via redundant communication links, for example mobile radio and WLAN.

In one specific embodiment of the present invention, in addition to the present surroundings situation, the future presumed traffic situation is ascertained via predictions and sent. The prediction is made, for example, based on infrastructure data, and additionally based on motor vehicle data, for example.

Motor vehicle data include, for example, a present trajectory and/or a future trajectory of the motor vehicle.

In addition, for example data from other sources that may influence the predictions, such as weather, are also added/used.

In one specific embodiment of the present invention, these predictions (the future traffic situation) are sent to the motor vehicle(s) with the aid of the communication device. These motor vehicles may thus use the prediction, for example to plan and implement a driving function.

In one specific embodiment of the present invention, a criticality of the present and/or future traffic situation is also ascertained with the aid of the processor device. The criticality indicates, for example, a potential accident position, and/or which vehicle will have an accident, and when. Based on the criticality, the processor device ascertains, for example, whether there could be accident avoidance measures, and if yes, they are appropriately initiated with the aid of the processor device. This means that the processor device ascertains appropriate infrastructure assistance data in order to initiate an accident avoidance measure. For example, in such a case the infrastructure assistance data include remote control commands for remotely controlling a particular transverse and/or longitudinal guidance of the motor vehicle(s) in such a way that with an appropriate remote control, the accident may be avoided or the severity of an accident may be reduced.

In one specific embodiment of the present invention, in addition to the present data and predictions for individual/all motor vehicles, trajectories are computed with the aid of the processor device and sent with the aid of the communication device.

In one specific embodiment of the present invention, a normal travel trajectory (target comfort/normal driving) is computed for the normal case with the aid of the processor device. In one specific embodiment, an emergency trajectory is computed with the aid of the processor device, thus, for example, if the motor vehicle detects an error in its own sensors and must end the at least semi-automated driving, and/or, for example, if the processor device recognizes a hazardous situation based on the analyses.

In a further specific embodiment of the present invention, intervention is made directly into an operation of the motor vehicle with the aid of the remote control commands. Such an intervention includes the following actions, for example: a steering action and/or a braking action and/or a drive system action.

In one specific embodiment of the present invention, the device drives the motor vehicle using the remote control commands.

In one specific embodiment of the present invention, the device controls one or multiple infrastructure components, for example sensor(s), traffic light(s), gate(s), etc. This is carried out based on the ascertained and/or future traffic situation, for example.

In one specific embodiment of the present invention, the device checks the infrastructure components for error-free functioning.

In one specific embodiment of the present invention, the RSU configures and/or updates one or multiple infrastructure components.

In one specific embodiment of the present invention, the RSU is situated on site, for example in front of the tunnel.

In one specific embodiment of the present invention, the RSU is situated in the vicinity, for example at a distance of 500 m away in a base station.

In one specific embodiment of the present invention, the RSU is situated far/further away, for example several (hundred) kilometers away, in an operations center or server station.

In one specific embodiment of the present invention, the RSU is split up; for example, the communication device is situated in the vicinity, and the processor device is situated in an operations center or in a server station.

In one specific embodiment of the present invention, the device or portions thereof (hardware and/or software, in particular algorithms, etc.) has/have a diversified and/or redundant design.

This may yield the technical advantage, for example, that the analyses/results are correct with a very high probability, and/or that in the event of an error/failure of the device, the infrastructure data may continue to be computed, at least for a short time, and provided to the motor vehicles.

According to one specific embodiment of the present invention, it is provided that one or multiple method steps are documented, in particular in a blockchain.

This may yield the technical advantage, for example, that even after the method is carried out or implemented, it may be subsequently analyzed based on the documentation. Documenting in a blockchain yields the technical advantage in particular that the documentation is secure against manipulation and falsification.

A blockchain is in particular a continuously expandable list of data sets, referred to as "blocks," that may be linked together with the aid of one or multiple cryptographic methods. Each block contains in particular a cryptographically secure hash value of the preceding block, in particular a time stamp, and in particular transaction data.

When the term "device" is used, the term "RSU" is always to be construed, and vice versa.

The error case includes, for example, a faulty function and/or a functional limitation or failure of at least one component, for example the communication device, for example the first communication interface (see below) and/or the processor device, for example the first processor (see below) and/or the energy unit of the device.

The phrase "at least one" means "one or multiple."

In one specific embodiment of the present invention, it is provided that the processor device includes a first processor and a second processor. The first processor is configured, for example, to ascertain the infrastructure assistance data based on the surroundings signals. The second processor is used as a backup processor, for example. This means, for example, that the second processor is configured, in the event of an error, to ascertain the infrastructure assistance data based on the surroundings signals. For example, the second processor is configured to monitor the first processor in order to detect a failure and/or a functional limitation and/or a faulty function of the first processor. The monitoring is carried out regularly, for example periodically.

According to one specific embodiment of the present invention, the second processor is configured, in the event of an error, to continue operating for a predetermined time period, and to end the continued operation after the predetermined time period elapses. For example, the following applies:

$$8 \text{ s} \leq \text{predetermined time period} \leq 10 \text{ s}.$$

The continued operation in the event of an error includes, for example, that only limited infrastructure assistance is still provided. For example, a comfort trajectory is no longer ascertained, but with regard to a trajectory, instead only an emergency trajectory is ascertained. The background in particular is that in this case the first processor has already failed, so that there is no longer a backup processor for the second processor if it should fail or have a functional limitation.

This applies analogously for the communication device, for example, which includes a first communication interface and a second communication interface, for example. The first communication interface is configured, for example, to receive the surroundings signals and to send the infrastructure assistance data signals. The second communication interface is used, for example, as a backup communication interface. This means, for example, that the second communication interface is configured, in the event of an error, to receive the surroundings signals and to send the infrastructure assistance data signals.

According to one specific embodiment of the present invention, the second communication interface is configured, in the event of an error, to continue operating for a predetermined time period, and to end the continued operation after the predetermined time period elapses. For example, the following applies:

$$8 \text{ s} \leq \text{predetermined time period} \leq 10 \text{ s.}$$

The sending with the aid of the communication device includes, for example, sending to the motor vehicle, in particular sending to the motor vehicle via a communications network, for example a wireless communications network, for example via WLAN and/or mobile radio.

Exemplary embodiments of the present invention are illustrated in the figures and explained in greater detail in the following description.

BRIEF DESCRIPTION OF THE DRAWINGS

FIG. 1 shows a device for infrastructure-supported assistance of a motor vehicle, according to an example embodiment of the present invention.

FIG. 2 shows a method for infrastructure-supported assistance of a motor vehicle, according to an example embodiment of the present invention.

FIG. 3 shows a machine-readable memory medium, according to an example embodiment of the present invention.

DETAILED DESCRIPTION OF EXAMPLE EMBODIMENTS

Figure 4:
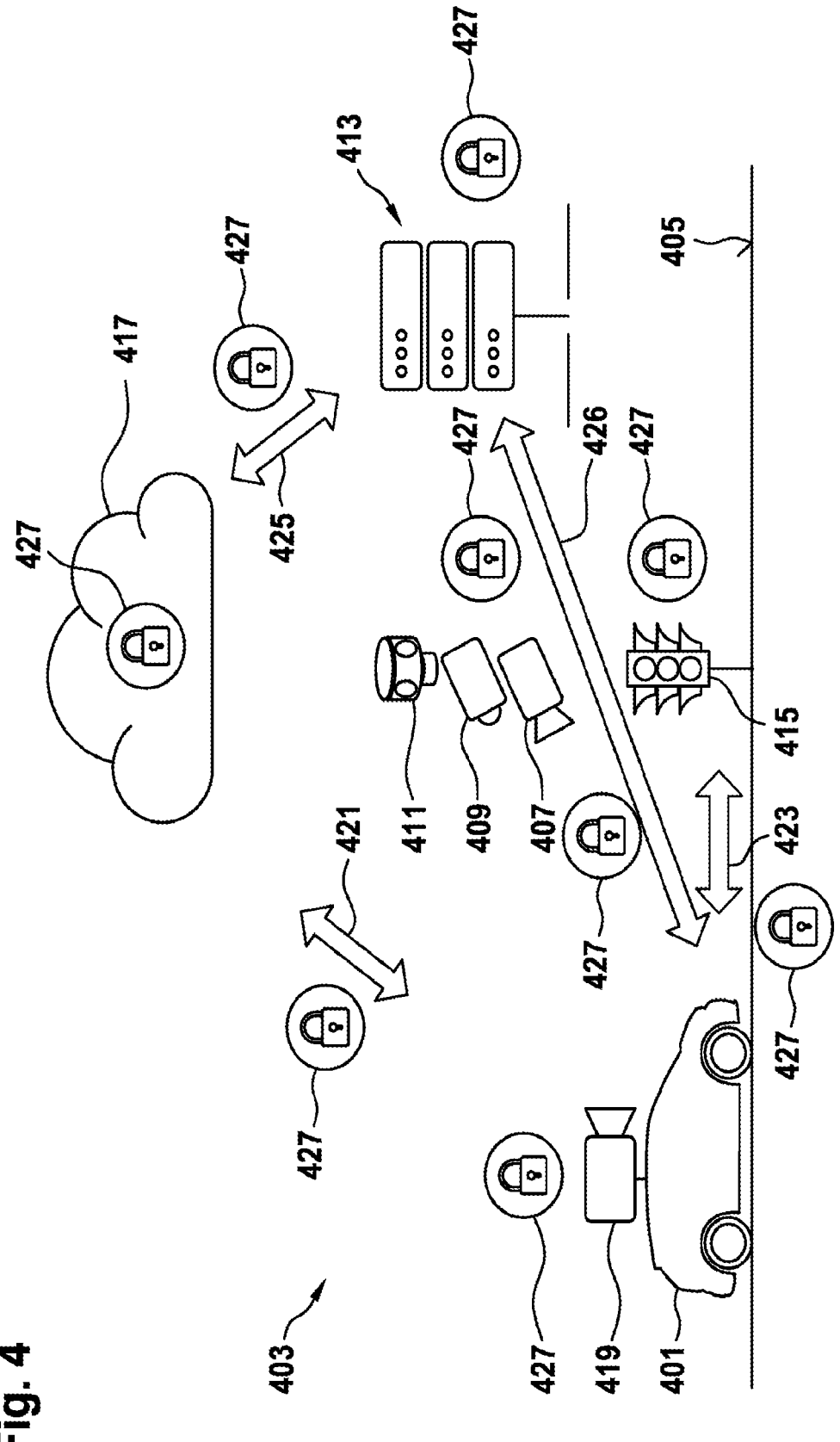
FIG. 4 shows a motor vehicle that is traveling within an infrastructure, according to an example embodiment of the present invention.

FIG. 1 shows a device 101 for infrastructure-supported assistance of a motor vehicle.

Device 101 includes:

a communication device 103 that is configured to receive surroundings signals that represent the surroundings of the motor vehicle, a processor device 105 that is configured to ascertain, based on the surroundings signals, infrastructure assistance data for infrastructure-supported assistance of the motor vehicle, communication device 103 being configured to send infrastructure assistance data signals that represent the ascertained infrastructure assistance data, communication device 103 and processor device 105 each being configured to continue operating in the event of an error, in such a way that communication device 103 continues to receive surroundings signals, processor device 105 continues to ascertain, based on the surroundings signals, infrastructure assistance data for assisting the motor vehicle, and communication device 103 continues to send the infrastructure assistance data signals.

In addition, according to one specific embodiment it is provided that communication device 103 receives motor vehicle data signals that represent motor vehicle data. Processor device 105 ascertains the infrastructure assistance data based on the motor vehicle data.

Motor vehicle data include or describe, for example, a present trajectory and/or a future trajectory of the motor vehicle, and/or an instantaneous position of the motor vehicle, and/or an instantaneous speed of the motor vehicle.

In one specific embodiment not shown, it is provided that device 101 additionally includes an energy unit that is configured to supply elements of the device, in particular the communication device and/or the processor device, with electrical energy. The energy unit includes an electrical energy store, for example. The energy unit is configured, for example, to continue operating in the event of an error.

In one specific embodiment that is not shown, it is provided that device 101 additionally includes further components, for example an air conditioning unit.

FIG. 2 shows a flowchart of a method for infrastructure-supported assistance of a motor vehicle, using device 101 in FIG. 1.

The method includes the following steps:

receiving 201, with the aid of communication device 103, surroundings signals that represent the surroundings of the motor vehicle, ascertaining 203, with the aid of processor device 105, infrastructure assistance data for infrastructure-supported assistance of the motor vehicle, based on the surroundings signals, sending 205, with the aid of communication device 103, infrastructure assistance data signals that represent the ascertained infrastructure assistance data, communication device 103 and processor device 105 each being configured to continue operating 207 in the event of an error, in such a way that the communication device continues to receive 201 surroundings signals, the processor device continues to ascertain 203, based on the surroundings signals, infrastructure assistance data for infrastructure-supported assistance of the motor vehicle, and the communication device continues to send 205 the infrastructure assistance data signals.

The continued operation in the event of an error is symbolically denoted in FIG. 2 by an arrow having reference numeral 207.

For example, continued operation 207 is ended after a predetermined time period elapses. For example, continued operation 207 is continued for as long as, and ended only when, all motor vehicles that obtain infrastructure assistance via the infrastructure assistance data no longer need this infrastructure assistance in order to handle a present and/or future traffic situation themselves.

FIG. 3 shows a machine-readable memory medium 301.

A computer program 303 is stored on machine-readable memory medium 301, and includes commands which, when computer program 303 is executed by a computer, prompt the computer to carry out a method according to the second aspect.

FIG. 4 shows a motor vehicle 401 that is traveling within an infrastructure 403.

Infrastructure 403 includes a roadway 405 on which motor vehicle 401 is traveling.

Infrastructure 403 further includes a video sensor 407, a radar sensor 409, and a LIDAR sensor 411, these three infrastructure surroundings sensors being situated with a spatial distribution within infrastructure 403 and detecting the surroundings of motor vehicle 401. Surroundings signals that correspond to the particular detection and that represent the surroundings detected in each case are provided to an RSU 413. According to one specific embodiment of the device, RSU 413 is designed according to the first aspect, so that further explanations are dispensed with. In addition, the communication device and the processor device are not shown for the sake of clarity.

RSU 413 receives the surroundings signals, and based on the surroundings signals ascertains infrastructure assistance data, and sends infrastructure assistance data signals, which represent the infrastructure assistance data, to motor vehicle 401.

RSU 413 may control a traffic light 415, for example. For example, the infrastructure assistance data include control commands for controlling traffic light 415 in such a way that it displays a red signal to signal to motor vehicle 401 that it is to stop. This is advantageous, for example, when RSU 413 has established, based on an analysis of the surroundings, that there is a critical situation in the travel direction of the motor vehicle.

In addition, a cloud database 417 is optionally provided which may supply historical traffic data, for example, to RSU 413, on the basis of which RSU 413 ascertains the infrastructure assistance data.

Motor vehicle 401 includes a video sensor 419 on the roof that detects the surroundings of motor vehicle 401 and outputs surroundings signals corresponding to the detection. These surroundings signals are sent to RSU 413 with the aid of motor vehicle 401, for example, so that the RSU ascertains the infrastructure assistance data based on these additional surroundings signals.

In addition, four double arrows are depicted in FIG. 4: a first double arrow 421, a second double arrow 423, a third double arrow 425, and a fourth double arrow 426. These double arrows symbolize a particular communication link between individual elements illustrated in FIG. 4.

Thus, first double arrow 421 symbolizes a communication link between motor vehicle 401 and cloud database 417. Motor vehicle 401 may, for example, upload the surroundings signals of video camera 419 into cloud database 417, where they are further processed and, for example, fused with surroundings signals from further surroundings sensors of further motor vehicles in order to ascertain a fused surrounding model, which is sent to RSU 413.

Second double arrow 423 symbolizes a communication link between motor vehicle 401 and traffic light 415. Thus, for example, traffic light 415 may send a remaining green time to motor vehicle 401, so that on this basis the motor vehicle may be guided at least semi-automatedly, for example by adapting a speed to the remaining green time.

Third double arrow 425 symbolizes a communication link between RSU 413 and cloud database 417.

Fourth double arrow 426 symbolizes a communication link between motor vehicle 401 and RSU 413.

In addition, lock symbols having reference numeral 427 are depicted in FIG. 4 in order to clarify that the individual communication links or the transmitted pieces of information or data are optionally encrypted, for example. This means that an encrypted communication link is optionally established between the individual communication users or partners. This means that the individual pieces of information or data are optionally stored in encrypted form.

What is claimed is:

1. A device for infrastructure-supported assistance of a motor vehicle, comprising:

a communication device configured to receive surroundings signals that represent surroundings of the motor vehicle; and a processor device configured to ascertain, based on the surroundings signals, infrastructure assistance data for infrastructure-supported assistance of the motor vehicle;

wherein the communication device is configured to send infrastructure assistance data signals that represent the ascertained infrastructure assistance data;

wherein each of the communication device and the processor device is configured to continue operating in an event of an error, in such a way that the communication device continues to receive the surroundings signals, the processor device continues to ascertain, based on the surroundings signals, the infrastructure assistance data for assisting the motor vehicle, and the communication device continues to send the infrastructure assistance data signals, wherein the processor device is further configured to ascertain a criticality of a present or a predicted traffic situation, the criticality indicating at least one of a potential accident location, an involved vehicle, or a timing of a potential accident, and wherein the infrastructure assistance data are further ascertained based on the criticality to initiate accident avoidance measures.

2. The device as recited in claim 1, wherein the device is a roadside unit.

3. The device as recited in claim 1, wherein the communication device and/or the processor device has a redundant and/or diversified configuration.

4. The device as recited in claim 1, wherein the communication device and the processor device are each configured, in the event of an error, to end the continued operation after a predetermined time period elapses.

5. The device as recited in claim 1, wherein the communication device and the processor device are each configured, in the event of an error, to continue operating until the motor vehicle can handle a traffic situation without infrastructure assistance data.

6. The device as recited in claim 1, wherein the infrastructure assistance data include a control command for controlling an infrastructure component that is situated in the surroundings of the motor vehicle, the communication device being configured to send the control command to the infrastructure component.

7. The device as recited in claim 6, wherein the infrastructure component is a lighting device, the control command being ascertained in such a way that, for a control of the infrastructure component based on the control command, the lighting device illuminates: i) the motor vehicle, and/or ii) an infrastructure surroundings sensor that is situated in the surroundings of the motor vehicle.

8. The device as recited in claim 1, wherein the infrastructure assistance data include remote control commands for remotely controlling transverse and/or longitudinal guiding of the motor vehicle, the communication device being configured to send the remote control commands to the motor vehicle.

9. The device as recited in claim 1, wherein the processor device is configured to make a prediction, based on the surroundings signals, of a traffic situation that includes the motor vehicle in order to ascertain a future traffic situation, the processor device being configured to ascertain the infrastructure assistance data based on the future traffic situation.

10. The device as recited in claim 9, wherein the infrastructure assistance data include traffic situation data that represent the ascertained future traffic situation.

11. The device as recited in claim 1, wherein the infrastructure assistance data include first trajectory data that represent a comfort trajectory to be traveled by the motor vehicle in a normal case, and second trajectory data that represent an emergency trajectory to be traveled by the motor vehicle in an emergency case.

12. The device as recited in claim 1, wherein the processor device is configured to ascertain a configuration parameter and/or an update program for an infrastructure component, by reading out the configuration parameter and/or the update program from a memory, the communication device being configured to send the configuration parameter and/or the update program to the infrastructure component.

13. The device as recited in claim 1, wherein the processor device is configured to ascertain, in the event of an error, a communication message that indicates: i) how long infrastructure assistance via the infrastructure assistance data is still available, and/or ii) which motor vehicle is still obtaining infrastructure assistance via the infrastructure assistance data, the communication device being configured to send the communication message to the motor vehicle.

14. A method for infrastructure-supported assistance of a motor vehicle, using a device including:

a communication device configured to receive surroundings signals that represent surroundings of the motor vehicle, and a processor device configured to ascertain, based on the surroundings signals, infrastructure assistance data for infrastructure-supported assistance of the motor vehicle;

wherein the communication device is configured to send infrastructure assistance data signals that represent the ascertained infrastructure assistance data, the method comprising the following steps:

receiving, using the communication device, the surroundings signals that represent the surroundings of the motor vehicle;

ascertaining, using the processor device, the infrastructure assistance data for infrastructure-supported assistance of the motor vehicle, based on the surroundings signals;

sending, using the communication device, infrastructure assistance data signals that represent the ascertained infrastructure assistance data;

wherein each of the communication device and the processor device is configured to continue operating in an event of an error, in such a way that the communication device continues to receive the surroundings signals, the processor device continues to ascertain, based on the surroundings signals, the infrastructure assistance data for infrastructure-supported assistance of the motor vehicle, and the communication device continues to send the infrastructure assistance data signals, wherein the processor device is further configured to ascertain a criticality of a present or a predicted traffic situation, the criticality indicating at least one of a potential accident location, an involved vehicle, or a timing of a potential accident, and wherein the infrastructure assistance data are further ascertained based on the criticality to initiate accident avoidance measures.

15. A non-transitory machine-readable memory medium on which is stored a computer program for infrastructure-supported assistance of a motor vehicle, using a device including:

a communication device configured to receive surroundings signals that represent surroundings of the motor vehicle, and a processor device configured to ascertain, based on the surroundings signals, infrastructure assistance data for infrastructure-supported assistance of the motor vehicle;

wherein the communication device is configured to send infrastructure assistance data signals that represent the ascertained infrastructure assistance data, the computer program, when executed by a computer, causing the computer to perform the following steps:

receiving, using the communication device, the surroundings signals that represent the surroundings of the motor vehicle;

ascertaining, using the processor device, the infrastructure assistance data for infrastructure-supported assistance of the motor vehicle, based on the surroundings signals;

sending, using the communication device, infrastructure assistance data signals that represent the ascertained infrastructure assistance data;

wherein each of the communication device and the processor device is configured to continue operating in an event of an error, in such a way that the communication device continues to receive the surroundings signals, the processor device continues to ascertain, based on the surroundings signals, the infrastructure assistance data for infrastructure-supported assistance of the motor vehicle, and the communication device continues to send the infrastructure assistance data signals, wherein the processor device is further configured to ascertain a criticality of a present or a predicted traffic situation, the criticality indicating at least one of a potential accident location, an involved vehicle, or a timing of a potential accident, and wherein the infrastructure assistance data are further ascertained based on the criticality to initiate accident avoidance measures.

* * * * *